March 8, 1927.
LE ROY HARPER
UNIVERSAL JOINT
Filed Oct. 9, 1925
1,620,549
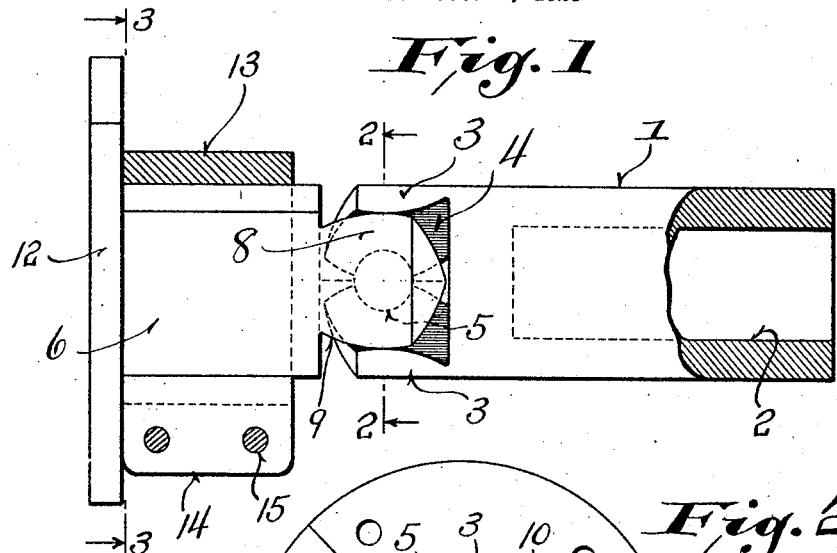
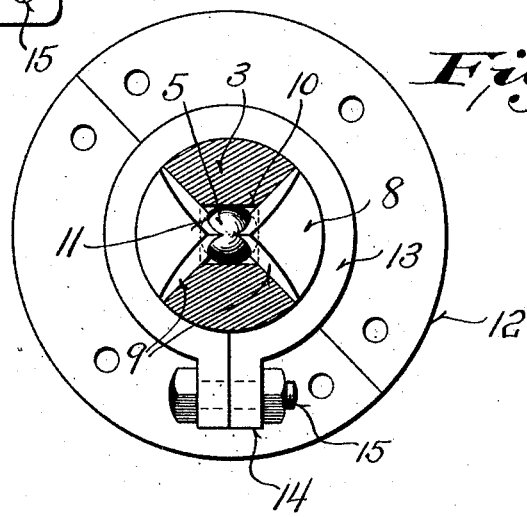
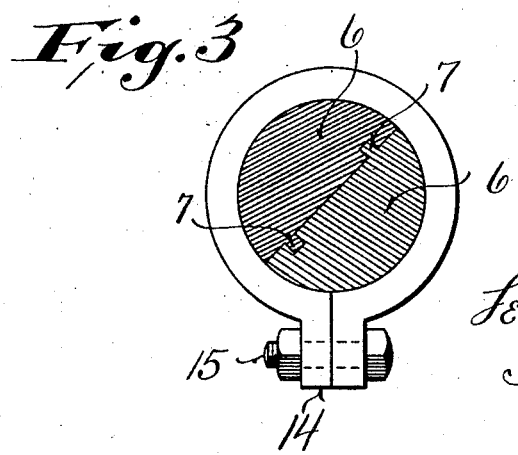
Inventor:
Le Roy Harper Patented Mar. 8, 1927.

1,620,549

UNITED STATES PATENT OFFICE.

LE ROY HARPER, OF KENOSHA, WISCONSIN.

UNIVERSAL JOINT.

Application filed October 9, 1925. Serial No. 61,478.

This invention relates to universal joints.

Objects of this invention are to provide a universal joint which may be formed in a simple and substantial manner, and which may be assembled very readily without requiring any elaborate machine shop process.

Further objects are to provide a universal joint which will transmit motion in an even manner irrespective of the angular displacement of the shafts, and which is provided with curved bearing faces adapted to permit the utmost freedom in adjustment of the relative parts of the joint.

An embodiment of the invention is shown in the accompanying drawings in which:—

Figure 1 is a side elevation partly in section of the universal joint.

Figure 2 is a sectional view on the line 2—2 of Figure 1.

Figure 3 is a sectional view on the line 3—3 of Figure 1.

The universal joint comprises a shaft section 1 which may be provided with a squared aperture 2 to receive the transmission shaft, or which may be keyed to the shaft if desired—this particular sliding connection being of any of the standard types. This shaft section 1 is provided with a pair of arms 3 arranged diametrically opposite each other and each provided with curved surfaces 4. These arms are bored out to receive a spherical steel ball 5 between them, such ball being slipped sidewise into the aperture between the arms.

The other half of the universal joint comprises a shaft section formed of two similar portions 6. Each of these portions is provided with a key, as indicated at 7, preferably formed integrally therewith and with a keyway so that the two sections may be assembled and will automatically key themselves together. Each section 6 is provided with an arm or finger 8 which has curved faces 9 corresponding to the curved faces 4 of the fingers 3. The fingers 8 are shown in full lines in Figure 2 and the fingers 3 in section in such figure. It is to be noted from this figure that the aperture in the fingers 3 for the reception of the ball is cylindrical and is indicated by the reference character 10, thus permitting the ball to be slipped sidewise into this aperture. However, the apertures in the fingers 8 for the reception of the ball 5 are spherical, as indicated by the reference character 11 in Figure 2. The ball thus serves to lock the parts together but does not serve in any capacity to transmit the torque of the shaft. If desired, each of the sections 6 may be formed with a half flange portion 12 which is adapted to be bolted to a corresponding flange of the mechanism with which the universal joint is used. The half sections 6 are held together by means of a collar 13 which is split and provided with a pair of apertured ears 14 through which the clamping bolts 15 pass.

In assembling the universal joint, it is merely necessary to slip the ball 5 into the cylindrical aperture 10. The half sections 6 are positioned on opposite sides of the ball and between the fingers 3 of the section 1. Thereafter, the collar 13 is slipped over the end of the section 1 and into the position shown in Figure 1. It is clamped tightly about the half sections 6 and thus locks them together causing them to act as a unitary structure.

It will be seen that when the parts are in their assembled position the ball 5 holds the parts against separation, although it plays no part whatsoever in the transmission of power. The power is actually transmitted by the contacting of the curved surfaces of the fingers 3 and 8. These fingers readily rock about each other when the two parts are angularly offset and yet a very smooth transmission of power is secured.

It is to be noted particularly that a very simple means is employed for holding the parts of the joints in assembled position and that no elaborate bearings at the universal joint are required. The actual bearing or contact for the parts is furnished by the relatively large and sturdy curved faces of the fingers 3 and 8, and thus a very strong, substantial and reliable universal joint is produced in practicing this invention.

Although the invention has been described in considerable detail, it is to be understood that the invention may be variously embodied and is, therefore, to be limited only as claimed.

I claim:

1. A universal joint comprising two main units each having fingers provided with curved surfaces with the surface of one set of fingers contacting with the surface of the other set of fingers, the inner portion of each of the fingers being recessed, a ball positioned within the recess and retaining the units against longitudinal separation, one of said units being split longitudinally, and a collar surrounding the split unit and holding its parts in correct position to provide a unitary unit, said collar being slidable from said split unit onto the other unit to permit separation of the units.

2. A universal joint comprising two main units each having fingers provided with curved surfaces with the surface of one set of fingers contacting with the surface of the other set of fingers, the inner portion of each of the fingers being recessed, a ball positioned within the recess and retaining the units against longitudinal separation, one of said units being split longitudinally, and a contractible collar surrounding the split unit and holding its parts in correct position to provide a unitary unit, the parts of said split unit having keys and keyways formed therein and cooperating to lock the parts together.

In testimony that I claim the foregoing I have hereunto set my hand at Kenosha, in the county of Kenosha and State of Wisconsin.

LE ROY HARPER.